US008949495B1

(12) United States Patent
Chen

(10) Patent No.: US 8,949,495 B1
(45) Date of Patent: Feb. 3, 2015

(54) INPUT DEVICE AND DATA TRANSMISSION METHOD THEREOF

(71) Applicant: Dexin Corporation, New Taipei (TW)

(72) Inventor: Shu-Sheng Chen, New Taipei (TW)

(73) Assignee: Dexin Corporation, New Taipei (TW)

( * ) Notice: Subject to any disclaimer, the term of this patent is extended or adjusted under 35 U.S.C. 154(b) by 0 days.

(21) Appl. No.: 14/132,766

(22) Filed: Dec. 18, 2013

(30) Foreign Application Priority Data

Sep. 18, 2013  (TW) .............................. 102133839 A

(51) Int. Cl.
  *G06F 13/12* (2006.01)
  *G06F 13/18* (2006.01)
  *G06F 13/28* (2006.01)
  *G06F 13/42* (2006.01)
  *G06F 3/038* (2013.01)
  *G06F 3/02* (2006.01)

(52) U.S. Cl.
  CPC ................ *G06F 13/18* (2013.01); *G06F 13/28* (2013.01); *G06F 13/4265* (2013.01); *G06F 3/038* (2013.01); *G06F 3/0227* (2013.01)
  USPC ........ 710/73; 710/8; 710/62; 710/65; 710/67; 710/71; 345/157; 345/163; 345/168; 463/37; 709/201

(58) Field of Classification Search
  None
  See application file for complete search history.

(56) References Cited

U.S. PATENT DOCUMENTS

| | | | |
|---|---|---|---|
| 7,209,470 B2 * | 4/2007 | McGowan ..................... | 370/349 |
| 7,222,201 B2 * | 5/2007 | Augustin et al. .............. | 710/105 |
| 7,962,668 B2 * | 6/2011 | Ding ............................... | 710/31 |
| 8,086,747 B2 * | 12/2011 | Dominic ........................ | 709/230 |
| 8,335,876 B2 * | 12/2012 | Davenport et al. ............. | 710/67 |
| 8,700,810 B2 * | 4/2014 | Park et al. .......................... | 710/8 |
| 2002/0065870 A1 * | 5/2002 | Baehr-Jones et al. ......... | 709/201 |
| 2002/0167932 A1 * | 11/2002 | McGowan ..................... | 370/349 |
| 2004/0133708 A1 * | 7/2004 | Augustin et al. ................. | 710/8 |
| 2004/0263477 A1 * | 12/2004 | Davenport et al. ........... | 345/163 |
| 2005/0066056 A1 * | 3/2005 | Dominic ........................ | 709/245 |
| 2006/0007151 A1 * | 1/2006 | Ram ............................. | 345/163 |
| 2009/0013097 A1 * | 1/2009 | Hsiao et al. ..................... | 710/16 |
| 2010/0161857 A1 * | 6/2010 | Ding ............................. | 710/69 |
| 2010/0228896 A1 * | 9/2010 | Park et al. ....................... | 710/36 |
| 2010/0262773 A1 * | 10/2010 | Borchers et al. ............. | 711/114 |
| 2012/0117137 A1 * | 5/2012 | Blocksome et al. .......... | 709/201 |
| 2013/0143657 A1 * | 6/2013 | Overton ......................... | 463/37 |
| 2014/0139437 A1 * | 5/2014 | Chao ............................ | 345/168 |

OTHER PUBLICATIONS

Wikipedia's 'Parallel Computing' article archived from Jun. 6, 2013.*
'USB Feature Specification: Shared Endpoints' by Systemsoft Corporation and Intel Corporation, Revision 1.0, Oct. 27, 1999.*
'Parallel Computing: Definitions, Examples and Explanations—What is Parallel Computing? A Not Too Serious Explanation' by Quentin F. Stout, archived on May 21, 2013.*

* cited by examiner

*Primary Examiner* — Steven Snyder
(74) *Attorney, Agent, or Firm* — Li & Cai Intellectual Property (USA) Office

(57) ABSTRACT

An input device with parallel multi-tasking capabilities is disclosed. The input device comprises a controller, a data assigning unit and a plurality of first communication end-points. The input device declares the plurality of first communication end-points as virtual peripheral devices with equivalent performance. When the input device is electrically connected to a host for data communication, the virtual peripheral devices with equivalent performance and a plurality of second communication end-points are respectively establish communication link of point-to-point correspondingly, so that the plurality of second communication end-points receive a plurality of operation slave data for reducing data communication time.

13 Claims, 4 Drawing Sheets

INPUT DEVICE AND DATA TRANSMISSION METHOD THEREOF

BACKGROUND OF THE INVENTION

1. Field of the Invention

The instant disclosure relates to an input device; in particular, to an input device with parallel multi-tasking capabilities.

2. Description of Related Art

With the technology well developed, the computer becomes essential in our lives. People rely on computers no matter for their work or the entertainment. Currently, in our society, the computer and its peripheral input device become a part of our daily lives. Also, regarding to the operation of the computer, the input device connected to the computer makes the user communicate with the computer and operate the computer easily. Thus, the input device plays an essential role for the communication between the computer and the user. Usually, the input device may be a mouse, a keyboard, a joystick for computers and the like. The input device brings a huge convenience to people for operating the computer, for example, the image scrolling, the article selecting, the instruction inputting and the like. Among lots kind of input devices, mouse is used most frequently by people, mainly because mouse is used for a basic connection and communication between the computer and the user, needless to say, which is extremely important.

However, with the technology developed continuously, the performance of mouse is more and more strictly required. Generally speaking, a mouse with a report rate of 125 Hz is sufficient for the computer operation in our daily lives. The report rate is defined as the report speed and frequency when a mouse is transmitting data. Take a report rate of 125 Hz for example, it refers to that 125 data are transmitted to the computer per second (with respect to time, it refers to that one data is transmitted to the computer every 8 ms.) Nevertheless, when it comes to the application to video games, a mouse merely with a report rate of 125 Hz seems rather insufficient. Currently, the report rate of a mouse applied to video games has reached 1000 Hz (that is, one data is transmitted to the computer every 1 ms.), while it is still not enough for the video game players. Therefore, nowadays many companies in the field of the peripheral input devices for computers have got involved in working on how to increase the report rate of a mouse.

SUMMARY OF THE INVENTION

The instant disclosure provides an input device with parallel multi-tasking capabilities. The input device comprises a controller, a data assigning unit, and a plurality of first communication end-points. The controller receives at least an operation instruction and transforms the operation instruction into an operation master data. The data assigning unit is electrically connected to the controller, and the data assigning unit receives and divides the operation master data into a plurality of operation slave data. The first communication end-points are electrically connected to the data assigning unit and the controller via pipelining manner and the first communication end-points respectively receives the operation slave data. Particularly, the input device declares the first communication end-points as a plurality of virtual peripheral devices with equivalent performance. When the input device is electrically connected to a host for a data communication, the virtual peripheral devices with equivalent performance and a plurality of second communication end-points inside the host respectively establish a point-to-point communication connection correspondingly, such that the second communication end-points respectively receive the operation slave data so as to reduce data communication time and via a data synthesizing unit inside the host the operation slave data is synthesized into the operation master data.

In an embodiment of the instant disclosure, the virtual peripheral devices with equivalent performance transmit the operation slave data to the second communication end-points corresponding respectively with a data report rate.

In an embodiment of the instant disclosure, a total data report rate of the input device is proportional to an amount of the virtual peripheral devices with equivalent performance, so as to increase an efficiency of the input device and reduce an overflow of a digital signal processing chip.

In an embodiment of the instant disclosure, the input device further comprises a data memory. The data memory is electrically connected to the controller and the data memory is used for storing a firmware program. Particularly, the controller declares the first communication end-points as the virtual peripheral devices with equivalent performance via execution of the firmware program.

In an embodiment of the instant disclosure, the input device is a mouse, a keyboard, or a headphone.

In an embodiment of the instant disclosure, the data memory is an erasable programmable read-only memory.

In an embodiment of the instant disclosure, before the operation slave data is transmitted to the host, the operation slave data is temporarily stored in the virtual peripheral devices with equivalent performance.

The instant disclosure further provides a data transmission method which is used for an input device with parallel multi-tasking capabilities. The input device comprises a controller, a data assigning unit and a plurality of first communication end-points. The data assigning unit is electrically connected to the controller, and the first communication end-points are electrically connected to the data assigning unit and the controller in parallel. The data transmission method comprises: receiving at least one operation instruction, transmitting the operation instruction into an operation master data and declaring the first communication end-points as a plurality of virtual peripheral devices with equivalent performance, via the controller; receiving and dividing the operation master data into a plurality of operation slave data via the data assigning unit; receiving the operation slave data respectively via the first communication end-points; and respectively establishing a point-to-point communication connection correspondingly between the virtual peripheral devices with equivalent performance and a plurality of second communication end-points inside the host respectively such that the second communication end-points respectively receive the operation slave data when the input device is electrically connected to a host for a data communication.

To sum up, the input device with parallel multi-tasking capabilities and the data transmission method thereof provided by the instant disclosure communicate data via a plurality of channels generated between the first communication end-points and the second communication end-points, so as to increase a data report rate and a resolution of a mouse.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

Figure 1:
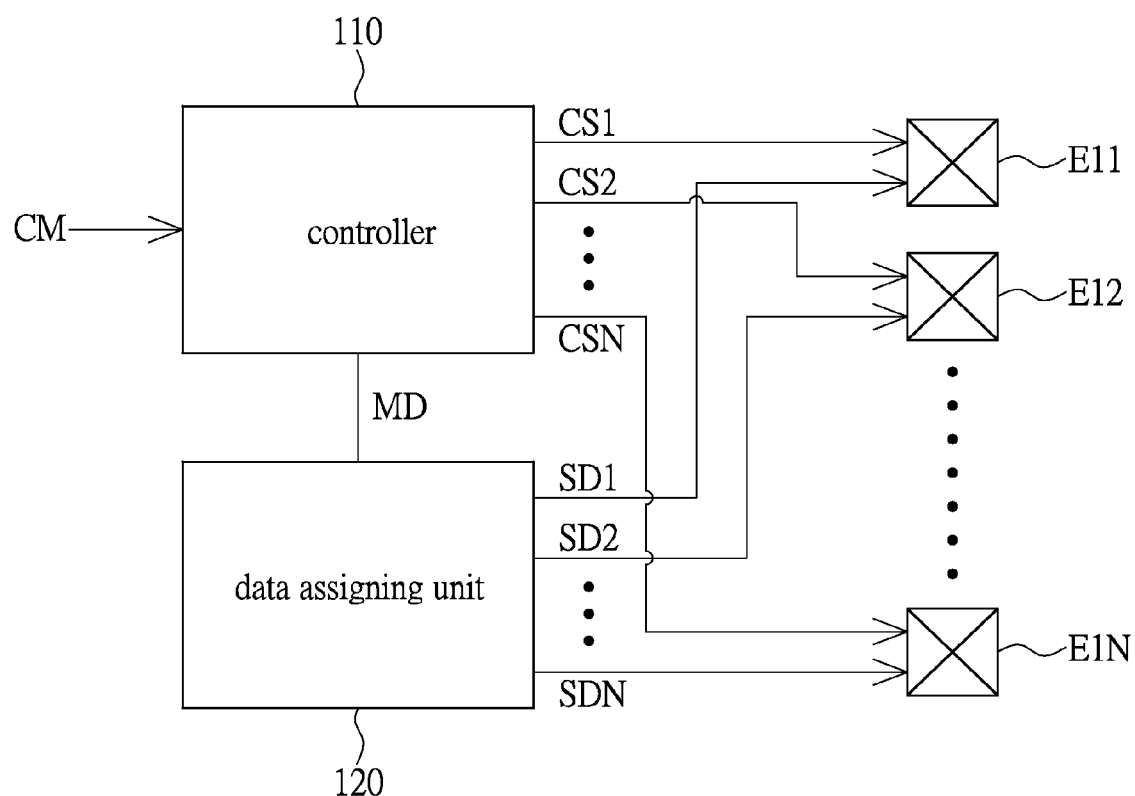
FIG. 1 shows a schematic block diagram of the circuit of an input device according to one embodiment of the instant disclosure.

Please refer to FIG. 1. FIG. 1 shows a schematic block diagram of the circuit of an input device according to one embodiment of the instant disclosure. In the present embodiment, an input device 100 with parallel multi-tasking capabilities comprises a controller 110, a data assigning unit 120 and a plurality of first communication end-points E11~E1N, in which N is a positive integer greater than 1. The data assigning unit 120 is electrically connected to the controller 110. The first communication end-points E11~E1N are electrically connected to the data assigning unit 120 and the controller 110 in parallel. The input device 100 may be a mouse, a keyboard, or a headphone, and when the user is operating the input device and an operation instruction is transmitted to the controller 110 according to the user's operation, the input device 100 provided by the instant disclosure is with parallel multi-tasking capabilities to process massive operation master data via a plurality of data transmission channels so as to increase a report rate of the input device 100.

With respective to the controller 110, the controller 110 receives at least an operation instruction CM and transforms the operation instruction CM into an operation master data MD according to the operating mode used by the user, and the controller 110 transmits control signals CS1~CSN to first communication end-points E11~E1N so as to establish transport points of a plurality of data transmission channels. The controller 110 may be the major processing and computing center inside the input device 100, such as a Micro Control Unit (MCU), a micro-processor, an Embedded Controller (EC) and the like.

With respective to the data assigning unit 120, the data assigning unit 120 receives the operation master data MD transmitted from the controller 110, and further divides or assigns the operation master data MD as a plurality of operation slave data SD1~SDN. Afterwards, the data assigning unit 120 transmits a plurality of operation slave data SD1~SDN to the first communication end-points E11~E1N corresponding.

With respective to the first communication end-points E11~E1N, the first communication end-points E11~E1N respectively receives the operation slave data SD1~SDN, and each of the first communication end-points E11~E1N is based on the USB communication protocol of the Human Interface Device (HID). In the present embodiment, the input device 100 declares the first communication end-points E11~E1N as a plurality of virtual peripheral devices with equivalent performance via the controller 110 so as to increase the amount of the data transmission channels. In the present embodiment, the controller 110 declares the first communication end-points E11~E1N as the virtual peripheral devices with equivalent performance through a firmware or a hardware.

For a specific instruction on an operation process of the input device 100 of the instant disclosure, there is at least one of the embodiments for further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

[One Embodiment of an Input Device with Parallel Multi-Tasking Capabilities]

Before further instruction, it is clarified that, for further understanding of the instant disclosure, the embodiment of the input device is taken an example of a mouse, but the instant disclosure is not restricted thereto.

Figure 2:
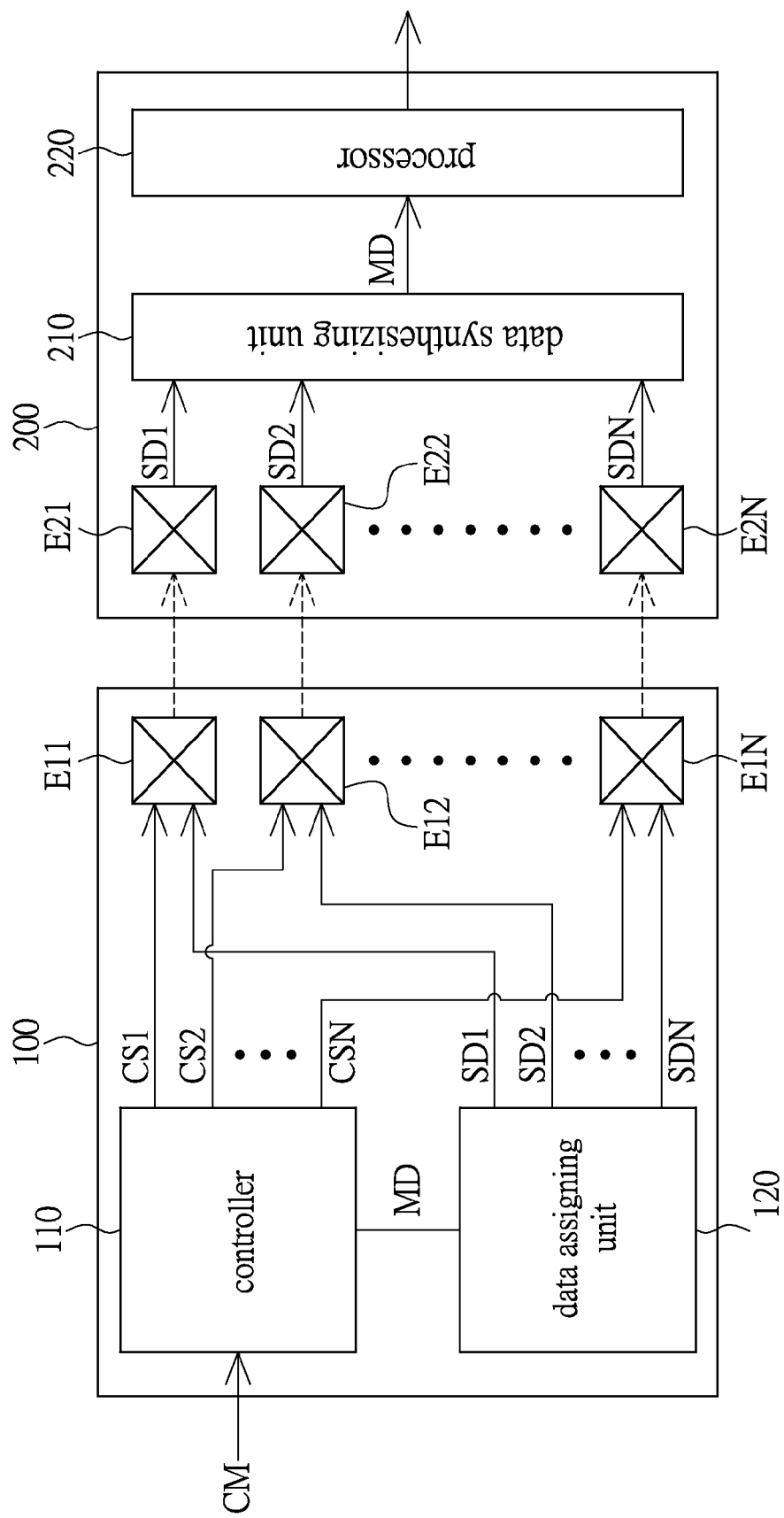
FIG. 2 shows a schematic block diagram of an input device according to one embodiment of the instant disclosure.

Please refer to FIG. 2. FIG. 2 shows a schematic block diagram of an input device according to one embodiment of the instant disclosure. In the present embodiment, the user operates a host 200 via a mouse (that is, an input device 100). When the input device 100 is electrically connected to the host 200 for a data communication (via a wireless connection or a wired connection), the virtual peripheral devices with equivalent performance inside the input device 100 (that is, first communication end-points E11~E1N) respectively establish a point-to-point communication connection correspondingly with a plurality of second communication end-points E21~E2N. In other words, there is a plurality of data transmission channels established. Furthermore, the controller 110 receives an operation instruction CM according to the user's operation, and the controller 110 transforms the operation instruction CM into an operation master data MD and transmits the operation master data MD to a data assigning unit 120. Afterwards, the data assigning unit 120 divides or assigns the operation master data MD as a plurality of operation slave data SD1~SDN and transmits the operation slave data SD1~SDN to the first communication end-points E11~E1N corresponding. At this time, there are a plurality of data transmission channels generated between the first communication end-points E11~E1N and the second communication end-points E21~E2N such that the input device 100 separately transmits the operation slave data SD1~SDN to the host 200. Particularly, before the operation slave data SD1~SDN is transmitted to the host 200, the operation slave data SD1~SDN is temporarily stored in the virtual peripheral devices with equivalent performance. At the terminal of the host, the virtual peripheral devices with equivalent performance are considered an input device 100 by the host 200, and the second communication end-points E21~E2N inside the host 200 receive the operation slave data SD1~SDN via the data transmission channels respectively so as to reduce a data communication time. Also, via a data synthesizing unit 210 inside the host 200 the operation slave data SD1~SDN is synthesized into the operation master data MD, and the operation master data MD is transmitted to the processor 220 for the relative processing, such as image scrolling, article selecting, instruction inputting, etc. In the present embodiment, the virtual peripheral devices with equivalent performance (that is, the first communication end-points E11~E1N) transmit the operation slave data SD1~SDN to the second communication end-points E21~E2N corresponding respectively with a data report rate. In addition, a total data report rate of the input device 100 is proportional to the amount of the virtual peripheral devices with equivalent performance so as to increase a transmitting efficiency or effect, such as a high resolution, and reduce an overflow of a digital signal processing chip. It is worth mentioning that, the controller 110 declares the first communication end-points E11~E1N as the virtual peripheral devices with equivalent performance through a hardware, such as an Application Specific Integrated Circuit (ASIC).

For instance, when the amount of the data transmission channels between the input device 100 and the host 200 is X, the data communication time is minus 1/X of the data communication time, in which X is an integer greater than 1. In one embodiment, if the amount of the data transmission channels between the input device 100 and the host 200 is three, and the data communication time is minus ⅓ of the data communication time. Currently, the report rate of a mouse for sale used for video games has reached to 1000 Hz (which means, one data is transmitted to the computer every 1 ms). Via the input device of the instant disclosure, three data is transmitted to the computer every 1 ms.

Briefly, ideas which are relative to increasing total data report rate via increasing the amount of the data transmission channels between the input device and the host are within the scope of the technique and the idea of the instant disclosure.

For a specific instruction on an operation process of the input device 100 of the instant disclosure, there is at least one of the embodiments for further instruction.

In the following embodiments, there are only parts different from embodiments in FIG. 2 described, and the omitted parts are indicated to be identical to the embodiments in FIG. 2. In addition, for an easy instruction, similar reference numbers or symbols refer to elements alike.

[Another Embodiment of an Input Device with Parallel Multi-Tasking Capabilities]

Figure 3:
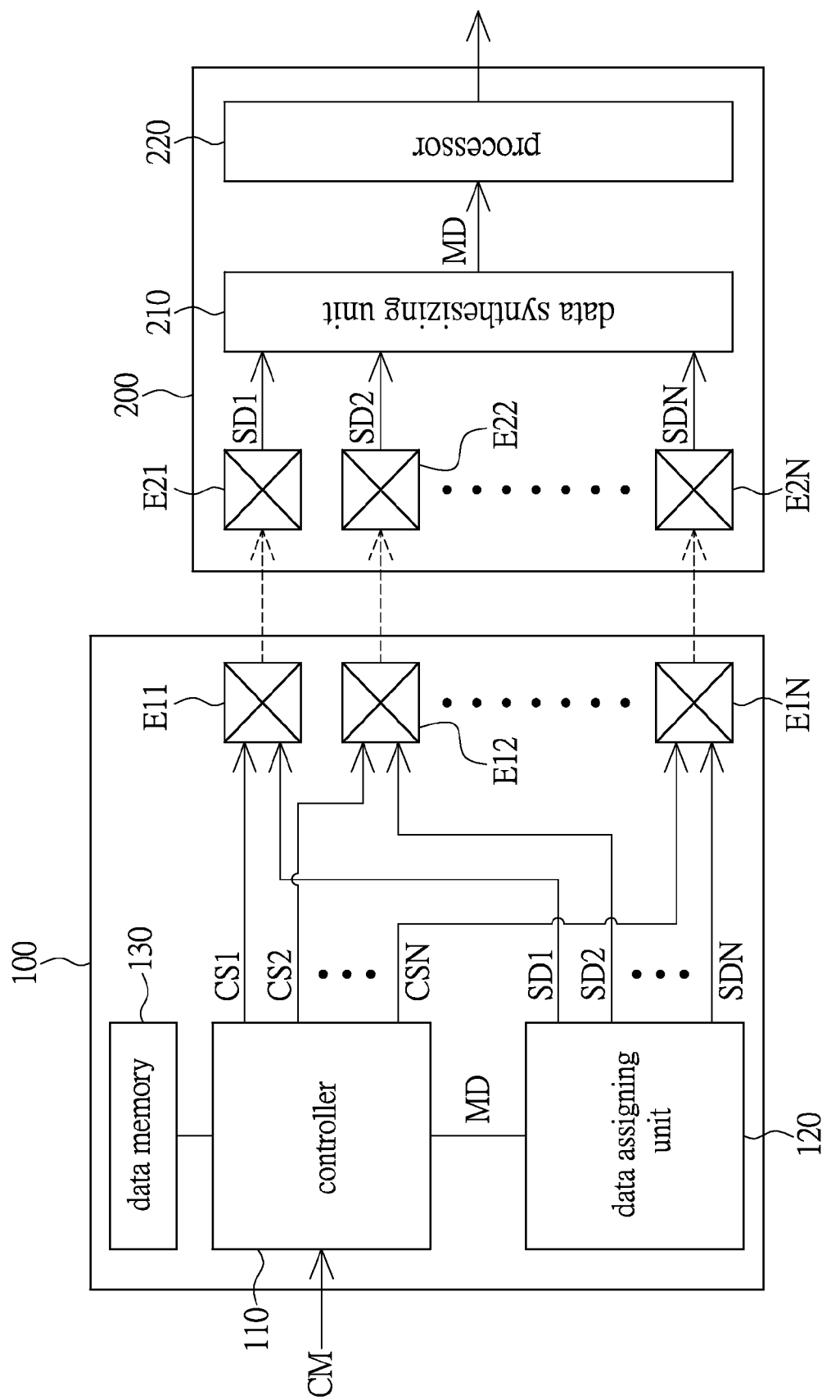
FIG. 3 shows a schematic block diagram of an input device according to one embodiment of the instant disclosure.

Please refer to FIG. 3. FIG. 3 shows a schematic block diagram of an input device according to one embodiment of the instant disclosure. Different from the embodiment in FIG. 2, the input device 100 further comprises a data memory 130. The data memory is electrically connected to the controller 110, and the data memory 130 may be an erasable programmable read-only memory. The data memory 130 is used for storing firmware program, and in particular the controller 110 declares the first communication end-points E11~E1N as the virtual peripheral devices with equivalent performance via the firmware program.

Likewise, in the present embodiment, the user operates the host 200 via a mouse (that is, the input device). When the input device 100 is electrically connected to the host 200 for a data communication (a wired connection or a wireless connection), the virtual peripheral devices with equivalent performance inside the input device 100 (that is, the first communication end-points E11~E1N) respectively establish a point-to-point communication connection correspondingly with the second communication end-points E21~E2N inside the host 200. In other words, there is a plurality of data transmission channels established. The rest of the working mechanism in accordance with the present embodiment is similar to that of the embodiment shown in FIG. 2, and thus the redundant information is not repeated. The skilled in the art will appreciate the implementation manner the present embodiment based on the above instruction of the embodiment shown in FIG. 2.

[One Embodiment of a Data Transmission Method]

Figure 4:
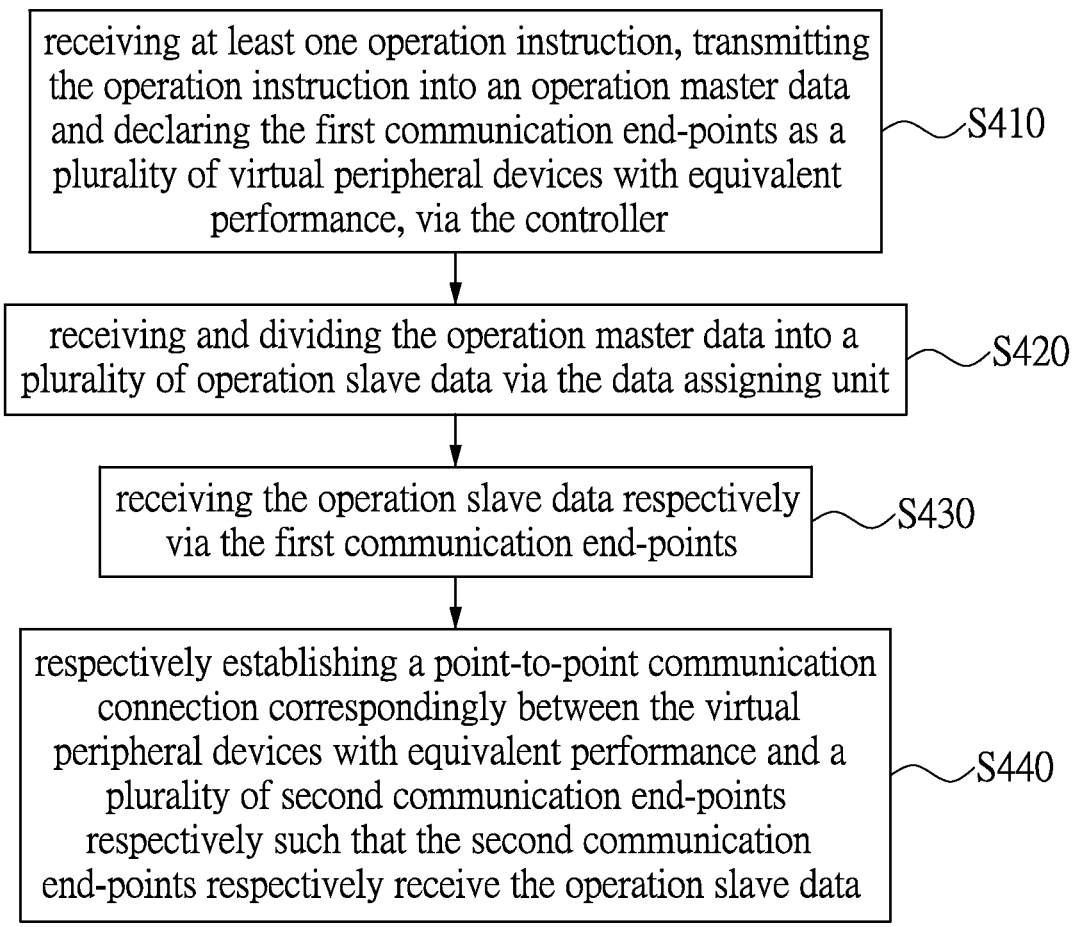
FIG. 4 shows a flow chart of a data transmission method according to one embodiment of the instant disclosure.

Please refer to FIG. 4. FIG. 4 shows a flow chart of a data transmission method according to one embodiment of the instant disclosure. The method in the present embodiment may be embodied with the input device 100 as shown in FIG. 2 or the input device 100 in FIG. 3, and thus please refer to FIGS. 2 and 3 for an easy understanding. The data transmission method provided by the present embodiment is used for an input device with parallel multi-tasking capabilities 100 and the data transmission method comprises the steps as below: receiving at least one operation instruction CM, transmitting the operation instruction CM into an operation master data MD and declaring the first communication end-points E11~E1N as a plurality of virtual peripheral devices with equivalent performance, via the controller 110 (step S410); receiving and dividing the operation master data MD into a plurality of operation slave data SD1~SDN via the data assigning unit 120 (step S420); receiving the operation slave data SD1~SDN respectively via the first communication end-points E11~E1N (step S430); and respectively establishing a point-to-point communication connection correspondingly between the virtual peripheral devices with equivalent performance and a plurality of second communication end-points E21~E2N inside the host 200 respectively such that the second communication end-points E21~E2N respectively receive the operation slave data SD1~SDN when the input device 100 is electrically connected to a host 200 for a data communication (step S440).

Relevant details of the steps of the data transmission method are described in the embodiments of FIGS. 1-3, and thus it is not repeated thereto.

It is clarified that, a sequence of steps in FIG. 4 is set for a need to instruct easily, and thus the sequence of the steps is not used as a condition in demonstrating the embodiments of the instant disclosure.

To sum up, the input device with parallel multi-tasking capabilities and the data transmission method thereof provided by the instant disclosure communicate data via a plurality of channels generated between the first communication end-points and the second communication end-points, so as to increase a data report rate and a resolution of a mouse.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A human input device with parallel multi-tasking capabilities, comprising:
    a controller, receiving at least an operation instruction and transforming the operation instruction into an operation master data;
    a data assigning unit, electrically connected to the controller, the data assigning unit receiving and dividing the operation master data into a plurality of operation slave data; and
    a plurality of first communication end-points, electrically connected to the data assigning unit and the controller in parallel, the first communication end-points respectively receiving the operation slave data, wherein the human input device declares the first communication end-points as a plurality of virtual peripheral devices with equivalent performance;

wherein when the human input device is electrically connected to a host for a data communication, the virtual peripheral devices with equivalent performance and a plurality of second communication end-points inside the host respectively establish a point-to-point communication connection correspondingly, such that the second communication end-points respectively receive the operation slave data in parallel so as to reduce data communication time and via a data synthesizing unit inside the host the operation slave data is synthesized into the operation master data.

2. The human input device according to claim 1, wherein the virtual peripheral devices with equivalent performance transmit the operation slave data to the second communication end-points corresponding respectively with a data report rate.

3. The human input device according to claim 1, wherein a total data report rate of the input device is proportional to an amount of the virtual peripheral devices with equivalent performance, so as to increase an efficiency of the input device and reduce an overflow of a digital signal processing chip.

4. The human input device according to claim 1, further comprising:

a data memory, electrically connected to the controller, the data memory used for storing a firmware program, wherein the controller declares the first communication end-points as the virtual peripheral devices with equivalent performance via execution of the firmware program.

5. The human input device according to claim 1, wherein the input device is a mouse, a keyboard, or a headphone.

6. The human input device according to claim 4, wherein the data memory is an erasable programmable read-only memory.

7. The human input device according to claim 1, wherein before the operation slave data is transmitted to the host, the operation slave data is temporarily stored in the virtual peripheral devices with equivalent performance.

8. A data transmission method, used for a human input device with parallel multi-tasking capabilities, the human input device comprising a controller, a data assigning unit and a plurality of first communication end-points, the data assigning unit electrically connected to the controller, the first communication end-points electrically connected to the data assigning unit and the controller in parallel, the data transmission method comprising:

receiving at least one operation instruction, transforming the operation instruction into an operation master data and declaring the first communication end-points as a plurality of virtual peripheral devices with equivalent performance, via the controller;

receiving and dividing the operation master data into a plurality of operation slave data via the data assigning unit;

receiving the operation slave data respectively via the first communication end-points; and respectively establishing a point-to-point communication connection correspondingly between the virtual peripheral devices with equivalent performance and a plurality of second communication end-points inside a host respectively such that the second communication end-points respectively receive the operation slave data in parallel when the human input device is electrically connected to the host for a data communication.

9. The data transmission method according to claim 8, comprising:

synthesizing the operation slave data into the operation master data via a data synthesizing unit inside the host.

10. The data transmission method according to claim 8, wherein the virtual peripheral devices with equivalent performance transmit the operation slave data to the second communication end-points corresponding respectively with a data report rate.

11. The data transmission method according to claim 8, wherein a total data report rate of the human input device is proportional to an amount of the virtual peripheral devices with equivalent performance, so as to increase an efficiency of the human input device and reduce an overflow of a digital signal processing chip.

12. The data transmission method according to claim 8, the human input device further comprising:

a data memory, electrically connected to the controller, the data memory used for storing a firmware program, wherein the controller declares the first communication end-points as the virtual peripheral devices with equivalent performance via execution of the firmware program.

13. The data transmission method according to claim 8, wherein the human input device is a mouse, a keyboard or a headphone.

* * * * *